United States Patent
Day

(10) Patent No.: US 7,168,049 B2
(45) Date of Patent: Jan. 23, 2007

(54) SYSTEM AND METHOD FOR ALLOCATING COMPUTING RESOURCES

(75) Inventor: Brian Andrew Day, Pleasant Ridge, MI (US)

(73) Assignee: Silicon Graphics, Inc., Mountain View, CA (US)

( * ) Notice: Subject to any disclaimer, the term of this patent is extended or adjusted under 35 U.S.C. 154(b) by 716 days.

(21) Appl. No.: 10/174,718

(22) Filed: Jun. 18, 2002

(65) Prior Publication Data
US 2003/0231215 A1 Dec. 18, 2003

(51) Int. Cl.
G06F 15/00 (2006.01)
G06F 13/00 (2006.01)

(52) U.S. Cl. ............... 715/835; 715/810; 715/736

(58) Field of Classification Search .......... 715/764, 715/765, 835, 763, 771, 838, 837, 810, 840, 715/847, 853, 736
See application file for complete search history.

(56) References Cited

U.S. PATENT DOCUMENTS 6,111,561 A * 8/2000 Brandau et al. ............ 715/781
6,331,864 B1 * 12/2001 Coco et al. ................. 715/763
6,870,960 B1 * 3/2005 Ogawa ........................ 382/236
2003/0020763 A1 * 1/2003 Mayer et al. ............... 345/838

* cited by examiner

Primary Examiner—Cao (Kevin) Nguyen
(74) Attorney, Agent, or Firm—Schwegman, Lundberg, Woessner & Kluth, P.A.

(57) ABSTRACT

A system and method for allocating computing resources. The system obtains a current set of connections from the matrix switch and then renders a display which reflects the current state of the connections. Source and destination ports are displayed as icons with each icon bearing a label that describes the corresponding source or destination. In some embodiments, a user clicks on a source icon and drags it onto a destination icon to route a particular source to a destination. Dragging a source icon off of a destination icon breaks the connection between the source and destination. The display uses a variety of icons, colors, and grouping schemes to indicate other attributes of the ports, such information regarding X Server configuration, physical location of destination devices, and user login sessions.

40 Claims, 2 Drawing Sheets

SYSTEM AND METHOD FOR ALLOCATING COMPUTING RESOURCES

FIELD OF THE INVENTION

The present invention is related to computing systems, and more particularly to a system and method for allocating computing resources.

BACKGROUND INFORMATION

An ordinary PC has one monitor and one keyboard. The keyboard is typically connected to the PC by a keyboard cable that plugs into a keyboard port (e.g., PS/2 mini-DIN port) on the back of the machine and the monitor is typically connected to the PC by a monitor cable that plugs into a monitor port (e.g., a 15 pin VGA monitor port) on the back of the PC. The monitor port is conventionally part of a graphics card that is in the form of a circuit board inside of the computer. The graphics card in such computing systems is responsible for displaying graphics onto the monitor.

The keyboard is often referred to as an input mechanism to the PC. A typical PC also includes a mouse as another input mechanism. As used herein, all references to "keyboard" refers to the keyboard and/or the mouse.

Some computing systems include multiple keyboards and multiple monitors. During the operation of such computing systems, different users sit at separate keyboards. Each user is typically required to log onto the computing system with a unique logon id and each user's work is often displayed on a separate monitor. These types of computing systems require some mechanism (hardware or software) that associates a particular keyboard with one or more particular monitors.

On Unix systems, a graphics card is often referred to as a "pipe" and each keyboard and pipe combination is often referred to as an "X server". An X server represents a single user's logon session via hardware that is directly connected to that computer. An X server does not represent being connected to the computer from another computer via a network. During operation of the computing system a user can log onto an X server to enter data on the keyboard, move the mouse, and see information on the monitor. A second user, with a separate keyboard and monitor, can log onto a separate X server. When the first user enters data on his keyboard, it is delivered through his own pipe (i.e., the pipe that is associated with that keyboard in a configuration file) to one or more monitors. The first user's interaction with the computer is totally independent of the work being done by the second user because the second user is logged on to a separate X server.

The file that pairs up keyboards with pipes is often referred to as an "X server configuration file". The number of users that may simultaneously log on to the computing system is limited to the number of X servers that are defined in the X server configuration file.

A schematic of a simple X server configuration file might look like:

$X$ Server :0=keyboard0+pipe0

$X$ Server :1=keyboard1+pipe1

$X$ Server :2=keyboard3+pipe8

In some computing systems it is desirable to have more than one monitor port on each graphics card. For example, setting up two monitors side by side can provide a "double wide" display. In other computing systems, a plurality of monitors could be set up in an array to show a single super-size display.

Dividing the display of a single pipe into multiple parts is often called "channeling." Graphic cards, or pipes, that include multiple ports can be said to have "multi-channel" capability. The number of ports on the pipes (i.e., graphics cards) in a computing system depends on the design of the computing system. It should be noted that channels are not defined or referred to in the X server configuration file.

Depending on the application, it is often desirable for the X server configuration file to establish one or more "multipipe" configurations such that two or more pipes service a single keyboard. Note that the number of pipes in a particular X server is independent of the number of channels that a corresponding display is rendered on. However, using additional pipes to transmit a display along a particular X server increases the capability of the computing system to send graphics to whatever amount of monitors that are attached to the pipes.

An example X server configuration file for such a multipipe arrangement might look like:

$X$ Server :0=keyboard0+pipe0

$X$ Server :1=keyboard1+pipe1

$X$ Server :2=keyboard3+pipe6+pipe7

In an environment where there are many keyboards and monitors, it is desirable to be able to easily change which keyboards are connected to which keyboard ports and which monitors are connected to which monitor ports. One mechanism for accomplishing this is a device known as a "matrix switch", or hub. Conventional matrix switches are sold by companies such as Lightwave, Extron, and Blackbox.

One such matrix switch includes several input ports and output ports such that any input port may be connected to any output port by reconfiguring the matrix switch. In some embodiments, keyboard and graphics card resources in a computer are connected to the input side of the matrix switch and the actual keyboard and monitor devices are connected to the output side.

The keyboard and graphics card resources are typically routed to the keyboard and monitor devices via software internal to the matrix switch as opposed to physically maneuvering the switch. In existing computing systems, a switch administrator operates the software that runs the matrix switch by issuing a command to the switch using a serial port on the matrix switch. Typical commands include "connect input 1 to output 7", or "disconnect input 2 from output 6". Some matrix switches allow one input signal to be "broadcast" to several outputs (e.g., "connect input 6 to outputs 6 and 7 and 2"). The use of port numbers and cryptic command syntax makes it difficult for a system administrator to manage the computing resources of an entire computing community.

Even a simple matrix switch yields several possible configurations. The complexity and number of combinations grows as more inputs and outputs are added to the matrix switch. The number of inputs and outputs depends on the design of the computing system and the desired number of users and locations where users can utilize the computing system.

During operation of such a computing system, an X server can be utilized by a user or may be idle (no one logged in). Users typically have the ability to log onto the computer system from multiple locations.

In addition, many computing systems are able to broadcast a single video input from one or more graphics cards (i.e., pipes) to multiple destinations. In these types of computing systems, the same display can be delivered to monitors in different locations.

Managing a matrix switch as part of the operation of such a system can be quite complex using existing software. Effective management of the computing resources attached to a matrix switch involves more than just making and breaking connections. The decisions on what to connect and disconnect are often based on information from the operating system about login sessions and X server configuration. Obtaining and correlating this type of information can be a cumbersome task using conventional systems. What is needed is a system and method that allows a system administrator to quickly and simply operate a matrix switch to allocate computing resources.

SUMMARY OF THE INVENTION

A system and method for allocating computing resources. A routing program in the system obtains a current set of connections from the matrix switch and then renders a display which reflects the current state of the connections. Resource (i.e., input) and destination (i.e., output) ports are displayed as icons with each icon bearing a label that describes the use of the corresponding port. In some embodiments, a user clicks on a resource icon and drags it onto the destination port icon to connect a particular resource to a destination. Dragging a resource icon off of a destination port icon breaks the connection between the corresponding ports. The display uses a variety of icons, colors, and grouping schemes to indicate other attributes of the ports, such information regarding X Server configuration, physical location of destination devices, and user login sessions. As used herein, "routing program" refers to any combination of hardware and software that displays resource and destination ports as icons.

According to one aspect of the present invention, a system of allocating computing resources is described. The system includes a matrix switch that is connected a computer having a plurality of resources. The system further includes a plurality of electronic devices connected to the matrix switch and a monitor connected to the computer and/or the matrix switch. A routing program instructs the matrix switch to route signals from the resources among the electronic devices and displays the resources as resource icons and the electronic devices as destination icons on the monitor. The routing software positions the resource icons relative to the destination icons when a respective resource that is represented by the resource icon is routed to an electronic device that is represented by a corresponding destination icon. In some embodiments, a resource is routed to an electronic device by dragging a resource icon that represents the resource to a destination icon that represents the electronic device.

According to another aspect of the present invention, a method of allocating computing resources is described. The method includes connecting a matrix switch to a plurality of resources within a computer and connecting a plurality of electronic devices to the matrix switch. The method further includes routing the resources to the electronic devices using the matrix switch and displaying the resources as resource icons and the electronic devices as destination icons on a monitor. The resource icons are positioned relative to the destination icons when a respective resource that is represented by the resource icon is routed to an electronic device that is represented by a corresponding destination icon. Some embodiments may further comprise dragging a resource icon to a destination icon to route a resource that is represented by the resource icon to an electronic device that is represented by the destination icon.

BRIEF DESCRIPTION OF THE DRAWINGS

In the following drawings, like numerals identify similar items in each of the separate drawings.

DETAILED DESCRIPTION

In the following detailed description, reference is made to the accompanying drawings which show by way of illustration specific embodiments in which the invention may be practiced. It is to be understood that other embodiments may be utilized and structural changes may be made without departing from the scope of the present invention. Unless specifically stated otherwise, it is appreciated that discussions utilizing terms such as "processing" or "computing" or "calculating" or "determining" or "displaying" or the like, refer to the action and processes of a computer system, or similar electronic computing device, that manipulates and transforms data.

Figure 1:
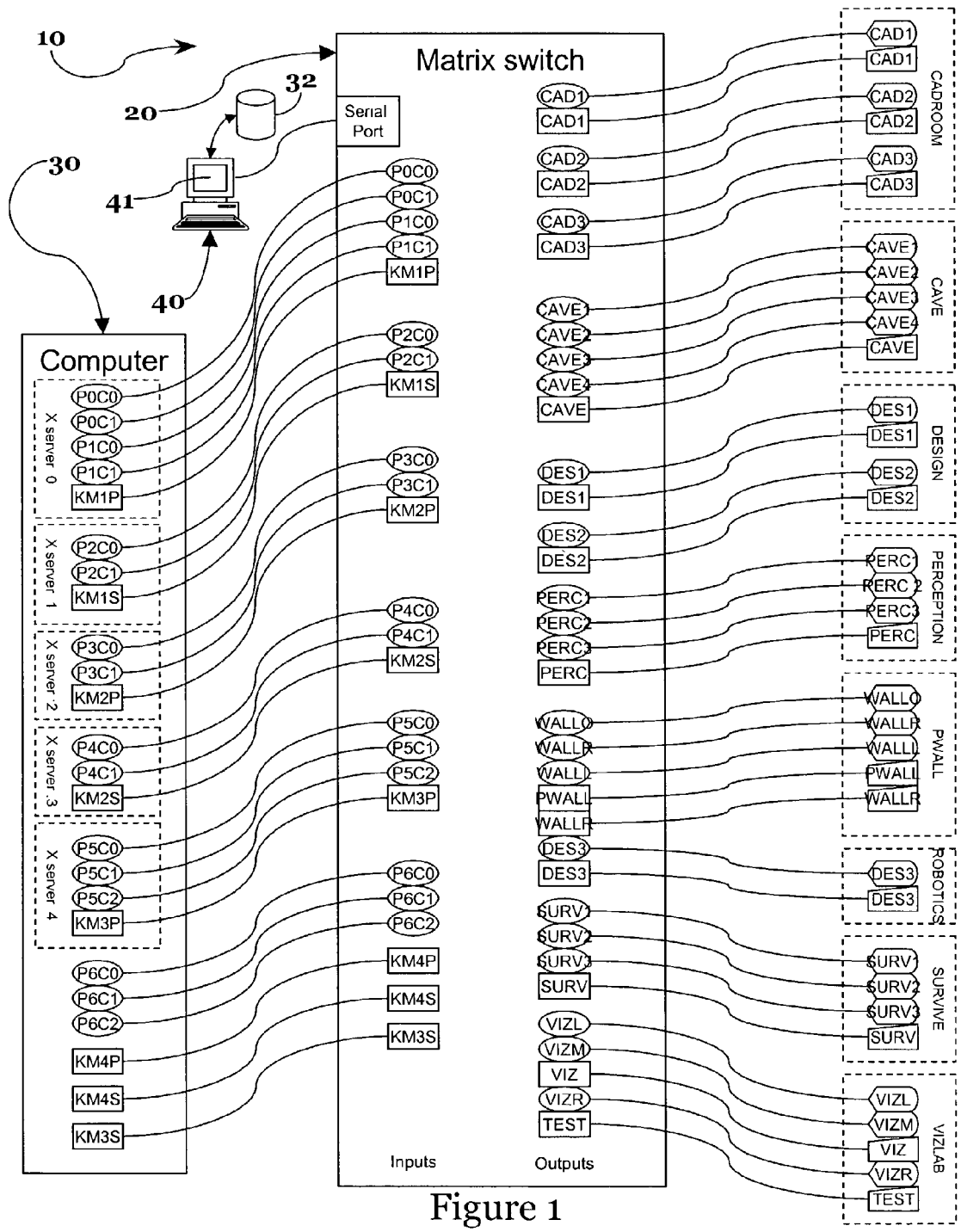
FIG. 1 is a system for allocating computing resources.

A system 10 and method for allocating computing resources is shown in FIG. 1. In one example embodiment, a routing program in system 10 displays a drag and drop user interface for controlling a matrix switch 20 that routes video and keyboard signals from a computer 30 to multiple destinations (e.g. CAD3, CAVE2 and DES1). System 10 shows where various computer resources are being routed, and allows a system administrator to view and change those routings from a terminal 40. Additional terminals may be added so that routings can be viewed and changed by a system administrator from more than one site.

In one embodiment, computer 30 includes or is connected to a device 32 for reading computer readable media from an article containing computer readable media. Examples of articles containing computer readable media are floppy disks, hard drives, CD-ROM or DVD media or any other read-write or read-only memory device. In one such embodiment, computer 30 is configured using instructions read from the article containing computer readable media.

In some embodiments, system 10 draws information from (i) the current connection state of matrix switch 20; (ii) the current X Server configuration of computer 30; (iii) the current set of active login sessions; and (iv) a configuration file in order to display routing information onto one or more monitors 41 at terminal 40. The configuration file equates short labels with each input and output port on the matrix switch, and organizes the output ports into logical groupings. In one such embodiment, the configuration file is read from an article containing computer readable media by device 32.

Resources within computer 30 are connected to input ports, while electronic devices, or "destinations" are connected to output ports on matrix switch 20. A grouping of electronic devices that are in related proximity to one another is called a "location". It should be noted that locations are not related to anything on matrix switch 20. In some embodiments, the routing program displays monitor and keyboard destinations by their physical location (e.g., within a room or building) into a group (e.g., a column). In the illustrated example embodiment, there are eight locations CADROOM, CAVE, DESIGN, PERCEPTION, PWALL, ROBOTICS, SURVIVE, VIZLAB.

Figure 2:
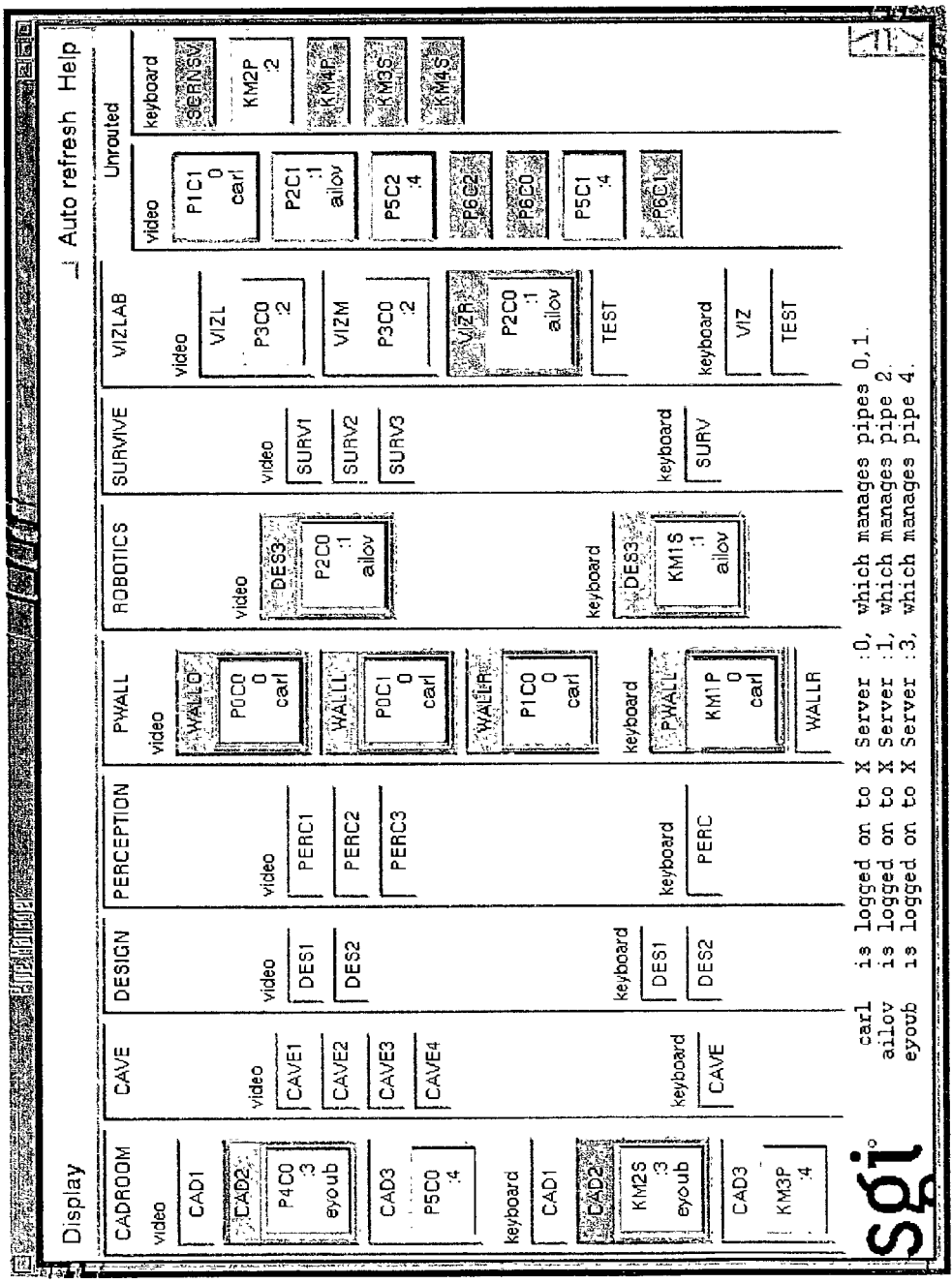
FIG. 2 illustrates an example screen snapshot generated by the system of FIG. 1.

An example screen snapshot 50 that gets displayed on monitor 41 is shown in FIG. 2. Each column on the left of the screen represents one of locations CADROOM, CAVE, DESIGN, PERCEPTION, PWALL, ROBOTICS, SURVIVE, VIZLAB. Although system 10 can be used in any application, sample screen snapshot 50 illustrates a large campus with several locations. The screen snapshot 50 displays all of the destinations within a location where a resource can routed. The video destinations are at the top and the keyboard destinations are at the bottom.

As an example, location CADROOM includes monitors CAD1, CAD2, CAD3 such that a video signal may be sent to any of the destinations CAD1, CAD2, CAD3 listed at the top of the CADROOM column, under the word "video". Similarly, CADROOM includes keyboards CAD1, CAD2, CAD3 such that a keyboard connection may be made with any of the destinations CAD1, CAD2, CAD3 listed at the bottom of the CADROOM column, under the word "keyboard".

As another example, location CAVE includes monitors CAVE1, CAVE2, CAVE3, CAVE4 such that a video signal may be sent to any of the destinations CAVE1, CAVE2, CAVE3, CAVE4 listed at the top of the CAVE column, under the word "video". Similarly, location CAVE includes keyboard CAVE such that a keyboard connection may be made with destination CAVE listed at the bottom of the CAVE column, under the word "keyboard".

In another example embodiment, some destination icons are displayed on monitor 41 in a group (such as a column) that represents related electronic devices. The electronic devices may be related for reasons other than physical location, such as common users and similar applications.

Resources are displayed as resource icons and destinations (i.e., electronic devices) are displayed as destination icons on the screen snapshot 50. Resource icons are positioned within the destination icons to which they are routed. In some embodiments, video resources may be broadcast (i.e., routed) to multiple destinations while keyboard resources may not. Resources which are not routed to any location are shown in the two rightmost columns, "unrouted video" and "unrouted keyboard".

Referring again to location CADROOM, video resource P5C0 is routed to monitor CAD3, while keyboard "KM3P" is routed to the corresponding keyboard CAD3. Monitor CAD2 and keyboard CAD2 also have resources routed to them, but the CAD1 keyboard and monitor destinations do not. Therefore, it would appear to someone at location CADROOM that the keyboard and monitors CAD2, CAD3 would be operational, while keyboard and monitor CAD1 would appear to be totally dead.

In some embodiments, color may be used to indicate the relationship of the resources to X servers. Each X server manages one keyboard and one or more pipes. Resources having the same color would be managed by the same X server. Relationships between X servers, X displays, pipes, and keyboards are described in "Multi-pipe Graphics Configurations"; March/April 1995, Pipeline Volume 6, Number 2, published by SGI of Mountain View, Calif., the description of which is incorporated herein by reference.

The X server number that controls a resource is shown on the second line of the colored resource icon. In the illustrated example screen snapshot 50, video resource P5C0 is managed by X server :4, as is the keyboard resource KM3P. In addition, all of the resources routed to location PWALL are managed by X server :0.

In location PWALL, the topmost resource shown is pipe 0, channel 0 (P0C0). Pipe 0, Channel 1 (P0C1) is shown next, followed by Pipe 1, Channel 0 (P1C0). All of these resources list ":0" on their label, meaning that pipes 0 and 1 are controlled by X server :0. The last resource listed as being routed to location PWALL with X server :0 is keyboard KM1P.

In some embodiments, not all of the resources on system 10 will be managed, such as when there are 9 keyboards and available 8 pipes. Since there can only be 8 X servers running at one time, at least 1 keyboard is "unmanaged". In some embodiments, unmanaged resources are colored gray by the system. Only those devices which are connected to managed resources will be operational. Devices connected to unmanaged resources will not operate. In the example screenshot 50, video resources P6C0, P6C1, P6C2 and keyboard resources KM4P, KM3S, KM4S are shown gray as unmanaged resources. Accordingly, system administrators would note the presence of a gray icon (i.e., an unmanaged resource) and would reallocate resources if needed.

In still other embodiments, a resource can be managed but unrouted (i.e., not connected to any destination). This is a waste of the resource because no one can get to the resource even though it is operable. In the example screenshot 50, resources P5C1 and P5C2 are shown off to the right as unrouted video resources. It should be noted that Pipe 5 is not totally going to waste because pipe 5, channel 0 is routed to destination CAD2. The items of most interest to a system administrator are the managed and routed resources.

In embodiments where resources that are managed by the same X server have the same color, there will typically be an orderly appearance to the screen snapshot 50. Similarly colored resources will often appear in the same column (i.e., the same location). When a system administrator sees that one color is spread across multiple columns, there may be an indication that something is improperly routed. As an example, if a system administrator routes a keyboard of a particular X server to one location, and routes a pipe on the same X server to another location, the keyboard in one room might control the video in another room. Color spread across multiple columns would help a system administrator to discover such a problem.

It should be noted that arranging colored icons into homogeneous columns does not necessarily mean that computing resources are properly allocated. As an example, the video for a given X server could be routed to one workstation while the corresponding keyboard is mistakenly routed to a different workstation in the same location. The column would still contain only one color, but things would be pretty confusing at that location.

As will be apparent to one of ordinary skill in the art, two X servers can be CADROOM). As an example, if a system administrator wanted to have three independent workstations operating simultaneously in the CADROOM location, the resources of three separate X servers would be routed to the room such that three colors would appear in CADROOM column 52A.

In some embodiments, resources are rerouted by dragging resource icons to new destinations. Video resource icons may only be dropped on video destinations, and keyboard resource icons may only be dropped on keyboard destinations. In some embodiments, the destinations will change color when you drag a resource over valid destinations, thus helping a system administrator to distinguish between valid and invalid drop sites. A resource is totally disconnected by dragging the resource icon off of its current destination and dropping it in the appropriate "unrouted video" or "unrouted keyboard" column.

Dragging a resource onto a destination that is already occupied (i.e., has some other resource already routed to it) may "bump" the old resource off and automatically disconnect the old resource from that destination. Unless the bumped resource was also routed (i.e., broadcast) to other locations, the bumped resource automatically moves into the appropriate unrouted column.

Dragging a keyboard resource icon from one destination to another causes the colored resource icon to disappear from the old destination. However, dragging a video resource icon from one valid destination to another places an icon on both destinations such that the signal is broadcast to both destinations. In most cases a system administrator will not want to broadcast the signal to both destinations. Therefore, the system administrator will have to drag the resource icon off of the old destination icon into the "unrouted video" column thereby forcing that connection to be broken. It should be noted that upon moving a broadcast video resource to the unrouted column, the video resource will not "stay" in that unrouted column. The unrouted column lists only those resources which are not routed anywhere. Since only one destination is disconnected from a broadcasted resource, the resource is still routed to at least one other destination such that the resource should not be listed as "unrouted". In order for the resource to show as unrouted, a system administrator would also have to disconnect it from all other destinations.

In some embodiments, the routing program generates a display based in part on a status report it obtains from matrix switch 20. As a system administrator moves resources around on the display, the routing program sends commands to matrix switch 20 to manipulate the status of matrix switch 20 and adjust the allocation of computing resources. If multiple system administrators manipulate matrix switch 20, then the displays that are delivered to each system administrator may become unsynchronized with the actual status of matrix switch 20. In some embodiments, the display can be refreshed such that a current status report is obtained from matrix switch 20 and displayed on monitor 41.

In another example embodiment, system 10 provides an option to have the display automatically refreshed at a given intervals. An "Auto refresh" checkbox may be displayed at the top of screen snapshot 50 such that clicking the checkbox invokes an automatic refreshing of the display at a particular time intervals.

In some example embodiments, a destination icon will be highlighted when a user is logged in at a particular destination. The text on the corresponding resource icon may be dimmed and the resource "locked" such that it can not be moved or disconnected. It should be noted that one or more system administrators may not restricted from moving resources that are part of login sessions. In some embodiments, a user may be able to move or disconnect resources that are part of their own login session. In addition, the resource icon may display a third line identifying the logon id of that user. A shown in FIG. 2, user "carl" is logged on to X server :0, which manages pipes 0 and 1 and keyboard KM1P. As a result, all of the coresponding resource icons contain a third line reading "carl", and four of the destinations in the PWALL location, where "carl" is working would be highlighted.

One example computer 30 is an SGI Onyx2 that includes 8 pipes which may be connected to the input side of a Lightwave matrix switch. The SGI Onyx2 system can be configured to include multiple X servers (i.e., login sessions). Each X server includes one and only one keyboard (and mouse). If the SGI Onyx2 system includes 8 keyboard input ports on the machine, it can be configured with at most 8 X servers. Each X server can use one or more pipes (i.e., graphics cards) and each pipe has the capability to drive up to 8 video channels.

Although the resources are described herein as keyboards and monitors, it should be noted that any type of resource or electronic device could be used with system 10 (e.g., serial data or audio data among others). In addition, the resources can supply signals to any number of devices, such as wands, gloves and space mice among others.

In the above discussion, the term "computer" is defined to include any digital or analog data processing unit. Examples include any personal computer, workstation, set top box, mainframe, server, supercomputer, laptop or personal digital assistant capable of embodying the inventions described herein.

In one embodiment, the system of the present invention is created by installing software from a computer readable medium onto a computer connected to a matrix switch. As noted above, examples of articles comprising computer readable media are floppy disks, hard drives, CD-ROM or DVD media or any other read-write or read-only memory device. In one such embodiment, the software contains the routing program and any utilities needed to set up a graphical user interface capable of displaying the routing of signals from the resources among the electronic devices using the matrix switch.

In another such embodiment, the software includes program code for displaying the resources as resource icons and the electronic devices as destination icons on a monitor such that the resource icons are positioned relative to the destination icons when a respective resource that is represented by the resource icon is routed to an electronic device that is represented by a corresponding destination icon.

System administrators have historically been forced to input numerous codes and analyze complex data in order to allocate computing resources among users at multiple destinations. However, as computing systems have become more complex, the job performed by system administrators has become untenable. System 10 described herein is a catalyst for simplifying the allocation of computing resources among users at multiple destinations.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A system for allocating computer resources, comprising:
   a computer that includes a plurality of resources;
   a matrix switch connected to the plurality of the resources;
   a plurality of electronic devices connected to the matrix switch;
   a monitor connected to at least one of the computer and the matrix switch; and
   a routing program that routes signals from the resources among the electronic devices using the matrix switch, wherein the routing program displays the resources as resource icons and the electronic devices as destination icons on the monitor, the resource icons being positioned relative to the destination icons when a respective resource that is represented by the resource icon is routed to an electronic device that is represented by a corresponding destination icon.

2. The system according to claim 1, wherein the resource icon is positioned within the destination icon when a resource that is represented the resource icon is routed to an electronic device that is represented by the destination icon.

3. The system according to claim 1, wherein a resource is routed to an electronic device by dragging a resource icon that represents the resource to a destination icon that represents the electronic device.

4. The system according to claim 1, wherein the routing program displays when a resource is routed to a plurality of electronic devices.

5. The system according to claim 1, wherein the resources are keyboard inputs and pipes and the electronic devices are keyboards and monitors, the routing program displaying the keyboard inputs as keyboard resource icons and the pipes as video resource icons, and the keyboards as keyboard destination icons and the monitors as video destination icons, the routing program only allowing keyboard resource icons to be routed to keyboard destination icons and video resource icons to be routed video destination icons.

6. The system according to claim 5, wherein the keyboard destination icons are displayed along a bottom of the monitor and the video destination icons are displayed along a top of the monitor.

7. The system according to claim 1, wherein at least one of the destination icons is displayed on the monitor as a column that represents a location.

8. The system according to claim 7, wherein the location is a room.

9. The system according to claim 1, wherein a plurality of destination icons is displayed on the monitor as a grouping that represents related electronic devices.

10. The system according to claim 1, wherein the resources include keyboards and pipes that are placed into X servers such that each X server includes one keyboard and at least one pipe.

11. The system according to claim 10, wherein the X server of each keyboard and pipe is identified on each corresponding resource icon.

12. The system according to claim 11, wherein the resource icons that represent resources with a common X server are the same color.

13. The system according to claim 11, wherein the routing program displays information relating to what X server a user is logged onto.

14. The system according to claim 1, wherein the routing program highlights a destination icon when a user is logged in at a corresponding electronic device that is represented by the destination icon.

15. The system according to claim 14, wherein the routing program locks a resource icon such that it can not be moved or disconnected when a user is logged into a corresponding resource that is represented by the resource icon.

16. The system according to claim 14, wherein the resource icon identifies the logon id of the user.

17. The system according to claim 1, wherein the routing program obtains a current status report from matrix switch and displays a current status of routings within the matrix switch.

18. The system according to claim 17, wherein the routing program displays a current status of routings within the matrix switch upon a user's command.

19. The system according to claim 17, wherein the routing program obtains a current status report from the matrix switch at a periodic interval designated by the user.

20. The system according to claim 1, wherein the routing program displays the resource icons that represent resources which are unrouted to any of the electronic devices in a group on the monitor.

21. The system according to claim 20, wherein the resource icons that represent unrouted resources are displayed in columns on the monitor, such that each column displays a unique type of resource.

22. The system according to claim 20, wherein the groups of unrouted resources displayed on the monitor are arranged according to the type of resource.

23. The system according to claim 1, wherein the resources are input-device inputs and pipes and the electronic devices are input devices and monitors, the routing program displaying the input-device inputs as input-device resource icons and the pipes as video resource icons, and the input devices as input-device destination icons and the monitors as video destination icons, the routing program only allowing input-device resource icons to be routed to input-device destination icons and video resource icons to be routed video destination icons.

24. The system according to claim 23, wherein the input-device destination icons are displayed along a bottom of the monitor and the video destination icons are displayed along a top of the monitor.

25. The system according to claim 1, wherein the resources include input devices and pipes that are placed into X servers such that each X server includes one input device and at least one pipe.

26. A method of allocating computing resources, comprising:
    connecting a matrix switch to a plurality of resources within a computer;
    connecting a plurality of electronic devices to the matrix switch;
    routing the resources to the electronic devices using the matrix switch; and
    displaying the resources as resource icons and the electronic devices as destination icons on a monitor such that the resource icons are positioned relative to the destination icons when a respective resource that is represented by the resource icon is routed to an electronic device that is represented by a corresponding destination icon.

27. The method according to claim 26, further comprising dragging a resource icon to a destination icon to route a resource that is represented by the resource icon to an electronic device that is represented by the destination icon.

28. The method according to claim 26, wherein displaying the resources as resource icons and the electronic devices as destination icons on a monitor includes positioning a resource icon within a destination icon when a resource that is represented the resource icon is routed to an electronic device that is represented by the destination icon.

29. The method according to claim 26 wherein displaying the resources as resource icons and the electronic devices as destination icons on a monitor includes arranging the destination icons into groups that represent related electronic devices.

30. A system for allocating computing resources of a computer that includes a plurality of resources connected to a matrix switch that routes signals generated by the resources among different electronic devices, the system comprising:
  a routing program that displays the resources as resource icons and the electronic devices as destination icons on the monitor; and
  wherein the resource icons are positioned relative to the destination icons when a respective resource that is represented by the resource icon is routed to an electronic device that is represented by a corresponding destination icon.

31. The system according to claim 30, wherein the resource icon is positioned within the destination icon when a resource that is represented by the resource icon is routed to an electronic device that is represented by the destination icon, and a resource is routed to an electronic device by dragging a resource icon that represents the resource to a destination icon that represents the electronic device.

32. The system according to claim 30, wherein the resources are keyboard inputs and pipes and the electronic devices are keyboards and monitors, the routing program displaying the keyboard inputs as keyboard resource icons and the pipes as video resource icons, and the keyboards as keyboard destination icons and the monitors as video destination icons, the routing program only allowing keyboard resource icons to be routed to keyboard destination icons and video resource icons to be routed video destination icons with the keyboard destination icons displayed along a bottom of the monitor and the video destination icons displayed along the top of the monitor.

33. The system according to claim 30, wherein the routing program highlights a destination icon when a user is logged in at an electronic device that is represented by the destination icon and locks a resource icon that is routed to the destination icon such that the resource icon can not be moved when a user is logged into a corresponding resource that is represented by the resource icon.

34. The system according to claim 30, wherein the routing program obtains a current status report from matrix switch at periodic intervals designated by the user and displays a current status of routings within the matrix switch.

35. The system according to claim 30, wherein the resources include keyboards and pipes that are placed into X servers such that each X server includes one keyboard and at least one pipe, the routing program identifying the X server of each keyboard and pipe and displaying X server identity on each corresponding resource icon.

36. The system according to claim 35, wherein the resource icons that represent resources with a common X server are the same color.

37. The system according to claim 30, wherein the resources include input-device inputs and pipes, and the electronic devices include input devices and monitors, and wherein the routing program displays the input-device inputs as input-device resource icons, the pipes as video resource icons, the input devices as input-device destination icons, and the monitors as video destination icons, and the routing program allows input-device resource icons to be only routed to input-device destination icons and video resource icons to be only routed video destination icons.

38. An article containing computer readable media having computer instructions therein, wherein the computer instructions, when installed on a computer that includes a plurality of resources which are connected to a matrix switch, displays resources connected to the matrix switch as resource icons and the electronic devices connected to the matrix switch as destination icons on a monitor and positions a resource icon relative to a destination icons when the resource represented by the resource icon is routed to the electronic device represented by the destination icon.

39. The article of claim 38, wherein the article further enables the computer to change the routing of the resources to the electronic devices by dragging one of the resource icons close to another destination icon.

40. The article of claim 38, wherein the article further enables the computer to change the routing of the resources to the electronic devices by dragging one of the destination icons close to another resource icon.

* * * * *